United States Patent
Allison et al.

(10) Patent No.: US 6,791,817 B2
(45) Date of Patent: Sep. 14, 2004

(54) ELECTRO ADHESION DEVICE

(76) Inventors: Herman Allison, 21 Bosloerie Avenue, Rooihuiskraal, 0154 Pretoria (ZA); Ronald Kevin Fricker, 654A Corrine Street, Garsfontein, 0042 Pretoria (ZA); Marthinus Christoffel Smit, 793A Platrand Street, Faerie Glen, 0043 Pretoria (ZA)

( * ) Notice: Subject to any disclaimer, the term of this patent is extended or adjusted under 35 U.S.C. 154(b) by 111 days.

(21) Appl. No.: 10/311,516
(22) PCT Filed: Jun. 13, 2001
(86) PCT No.: PCT/ZA01/00079
§ 371 (c)(1),
(2), (4) Date: Dec. 13, 2002
(87) PCT Pub. No.: WO01/96219
PCT Pub. Date: Dec. 20, 2001

(65) Prior Publication Data
US 2003/0184731 A1 Oct. 2, 2003

(51) Int. Cl.[7] .............................................. H02N 13/00
(52) U.S. Cl. ..................................................... 361/234
(58) Field of Search ............................... 361/230, 233, 361/234; 279/128

(56) References Cited
U.S. PATENT DOCUMENTS 3,970,905 A * 7/1976 Itoh et al. .................... 361/233
4,384,918 A   5/1983 Abe ............................. 361/234
4,724,510 A   2/1988 Wicker et al. ............... 361/234
5,090,643 A * 2/1992 Spears ......................... 244/163
5,838,529 A   11/1998 Shufflebotham et al. .... 361/234
5,858,099 A   1/1999 Sun et al. .................... 118/621
2003/0189807 A1 * 10/2003 Chiou et al.

FOREIGN PATENT DOCUMENTS

EP   0 701 319 A1   3/1996 .......... H02N/13/00
GB   1352715        5/1974 .......... H02N/13/00

* cited by examiner

Primary Examiner—Ronald Leja
(74) Attorney, Agent, or Firm—Ziolkowski Patent Solutions Group, LLC

(57) ABSTRACT

The invention provides an electro-adhesion device (10) including a base (12) and first (14) and second (16) banks of thin electrically conductive electrodes (18) located apart from each other on a side of the base (12). The electro-adhesion device (10) also includes an insulating cover (20) over the first (14) and second (16) banks so that the outer side of the insulating cover (20) defines an electro-adhesion surface so that, in use, when the electrodes (18) are energized and an object to be attracted is placed adjacent the insulating cover (20), the object is attracted to the insulating cover (20) by a suitably high adhesion force. An outer surface (24) of each of the electrodes (18) has a linear border on one side and a sinusoidal border on an opposite side so that the width of each electrode (18) varies sinusoidally lengthwise along the electrode (18).

20 Claims, 3 Drawing Sheets

FIGURE 1
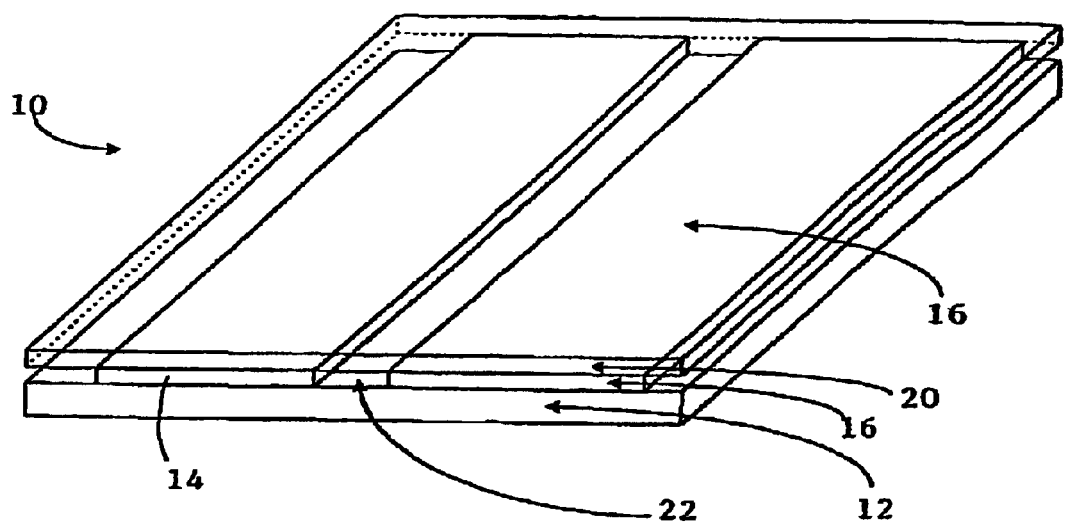
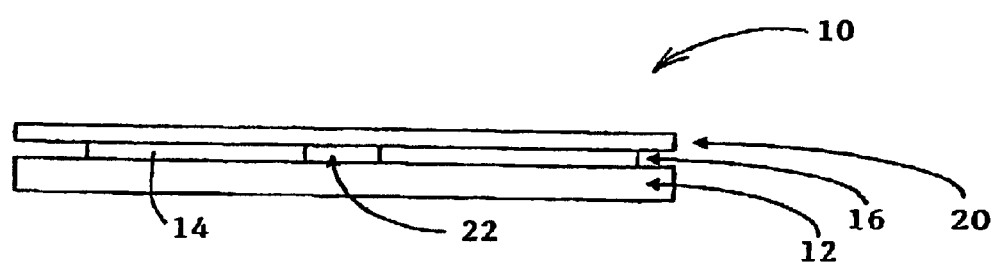
FIGURE 2

FIGURE 3
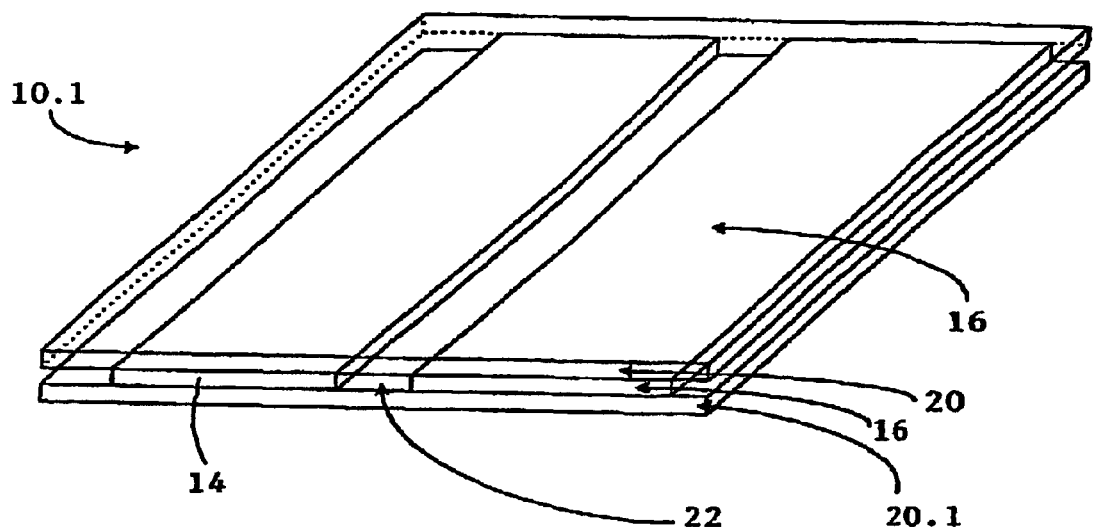
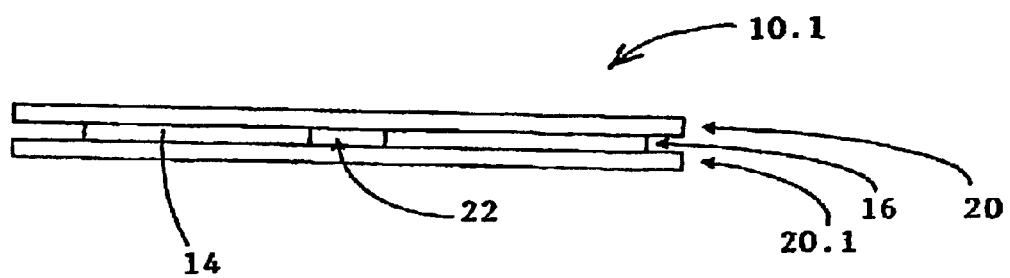
FIGURE 4

ELECTRO ADHESION DEVICE

CROSS-REFERENCE TO RELATED APPLICATION

This application is the national phase under 35 U.S.C. § 371 of PCT International Application No. PCT/ZA01/00079 which has an International filing date of Jun. 13, 2001, which designated the United States of America.

FIELD OF THE INVENTION

This invention relates to an electro-adhesion device.

BACKGROUND TO THE INVENTION

Electro-adhesion is the process of creating a charge in an object and thereby attracting it to a special surface. Electro-adhesion devices, for attracting a non-magnetic object such as paper, have not been introduced as consumer products due to the fact that they are either ineffective, in that they do not create a sufficient adhesion force, or very expensive to make due to the complexity of these devices.

A further problem is that it is very difficult to create one adhesion device that attracts objects of a variety of materials with suitable force. It is this application of the invention which should predominantly but not exclusively be borne in mind.

SUMMARY OF THE INVENTION

According to the invention there is provided an electro-adhesion device which includes a base; and at least two thin electrically conductive electrodes located apart from each other on the base so as to define an electro-adhesion surface so that, in use, when the electrodes are energised and an object to be attracted is placed adjacent the electro-adhesion surface, the object is attracted to the electro-adhesion surface by a suitably high adhesion force.

The electrodes may be located on one side of the base so that adjacent electrodes form an electrode pair, which electrode pair is energised, in use, so as to be oppositely polarised thereby causing a charge differential in a part of the object adjacent that electrode pair which in turn causes the object to be attracted to the electro-adhesion surface.

The electrodes may be located on opposite sides of the base when the base is made of a substance having a high dielectric constant (Epsilon), typically of at least 5. Electrodes of an electrode pair may be located on opposite sides of the base, which electrode pair is energised, in use, so as to be oppositely polarised thereby causing a charge differential in a part of the object adjacent that electrode pair which in turn causes the object to be attracted to the electro-adhesion surface. Electrodes on the same side of the base may be oppositely polarised to electrodes on the opposite side of the base thereby increasing a maximum withstand voltage between electrodes.

Each of the electrodes may have an outer surface facing away from the base which outer surface defines at least a part of the electro-adhesion surface and which outer surface has dimensions in any direction greater than the distance from such outer surface to the base, which distance is the thickness of the electrode. The electrode is typically extremely thin so as to limit charge build-up between adjacent electrodes. The electrodes are typically less than 5 $\mu$m thick.

The electrodes may be silkscreen electrodes. The electrodes may be vapour deposition electrodes.

The electro-adhesion device may be configured so that as little air as possible is trapped between adjacent electrodes.

The electrodes may be elongate electrodes located substantially parallel to each other on a side of the base.

Adjacent electrodes may be located apart from each other by a minimum distance which is related to a maximum withstand voltage between the electrodes before flashover occurs. As the electro-adhesion force is proportional to the voltage between an electrode pair, the minimum distance may be selected so that an appropriate voltage is accomplished between an electrode pair in order to accomplish a sufficient electro-adhesion force without flashover occurring. Adjacent electrodes may be located apart from each other by a fixed or varying distance greater than or equal to the minimum distance.

The electrodes may be shaped to limit sharpness of corners of the electrodes thereby reducing the possibility of flashover occurring.

The shapes of the outer surfaces of the electrodes may be selected depending on the material composition of the object to be attracted.

The electrodes of at least one electrode pair may have outer surfaces having large surface areas in order to attract metals. Typically, the electro-adhesion device for metals only includes two oppositely polarised electrodes separated by a single separation gap between them.

The electrodes of at least one electrode pair may have outer surfaces having small surface areas in order to attract non-metals.

The outer surfaces of the electrodes may be shaped so that they have varying surface areas so that, in use, the object to be attracted may be made from any one of a variety of materials including metals and non-metals, the object thereby being attracted with suitable electro-adhesion force regardless of the material. The varying surface area of the electrodes may be repetitive lengthwise along the electrodes. The outer surface of at least two of the electrodes may have a linear border on one side and a sinusoidal border on an opposite side so that the width of each electrode varies sinusoidally lengthwise along the electrode. Accordingly, the electrodes may be configured so that the sinusoidal border of one electrode is aligned adjacent the sinusoidal border of an adjacent electrode and so that the linear border of one electrode is aligned adjacent the linear border of an adjacent electrode, such that the minimum distance between adjacent electrodes remains fairly constant.

Typically, the electrodes of an electrode pair are oppositely polarised by a low current with a relatively high voltage. The electrodes may be polarised by way of a DC voltage. The low current is typically less than 5 $\mu$A DC and the relatively high voltage more than 1500 V DC.

The base is typically made of a substance chosen to minimise leakage from the electro-adhesion device such as a substance having a high bulk resistivity of at least $10^{16}$ $\Omega$/m.

The electro-adhesion device may comprise at least one layer formed by electrodes and a layer formed by the base. Accordingly the base may be thin so as to define a layer of the electro-adhesion device.

The profile of the base on which the electrodes are located typically determines the profile of the electro-adhesion surface. Accordingly, the profile of the base on which the electrodes are located may be shaped so as to correspond to the shape of a portion of the object to be attracted, which portion is the portion which is placed adjacent the electro-adhesion surface. This serves to minimise, in use, air gaps between the electro-adhesion surface and the object to be attracted.

In a preferred embodiment of the invention, the profile of the base on which the electrodes are located is typically flat, but in others it may follow any profile.

The base on which the electrodes are located is typically smooth. Such smoothness may be defined as having a surface variation of less than 0.01 µm.

The electro-adhesion device may include an insulating cover over the electrodes so that an outer side of the insulating cover defines the electro-adhesion surface. The cover is typically as thin as possible as the electro-adhesion force is inversely proportional to the distance between the electrodes and the object to be attracted. The cover may be thinner than 100 µm.

The cover may be in the form of a thin film. The film may be applied as a laminate.

The cover may be in the form of a coating. The coating may be applied as a spray on, dip in, or any other suitable means of application.

The cover is typically made from a substance having a high surface relative resistivity. The resistivity is typically more than $10^{16}$ Ω.

The cover may be made of a substance having a high dielectric constant (Epsilon), typically of at least 6.

The cover may be smooth. Such smoothness may be defined as having a surface variation of less than 0.01 µm.

The base may be in the form of an insulating cover as described above. Accordingly the electrodes may be sandwiched between two covers so that the electro-adhesion device includes two electro-adhesion surfaces.

The invention is not limited to the specific embodiments contained in this specification and all variations falling within the spirit of the invention are included in the scope of the invention as if specifically listed.

DESCRIPTION OF THE DRAWINGS

The invention will now be described, by way of illustration only, with reference to the accompanying non-limiting diagrams in which FIG. 1 shows a schematic representation, in three-dimensional view, of an electro-adhesion device in accordance with the invention;

FIG. 2 shows a schematic representation, in side view, of the electro-adhesion device of FIG. 1;

FIG. 3 shows a schematic representation, in three-dimensional view, of an electro-adhesion device, having a base in the form of an insulating cover, in accordance with the invention; and FIG. 4 shows a schematic representation, in side view, of the electro-adhesion device of FIG. 3.

Figure 5:
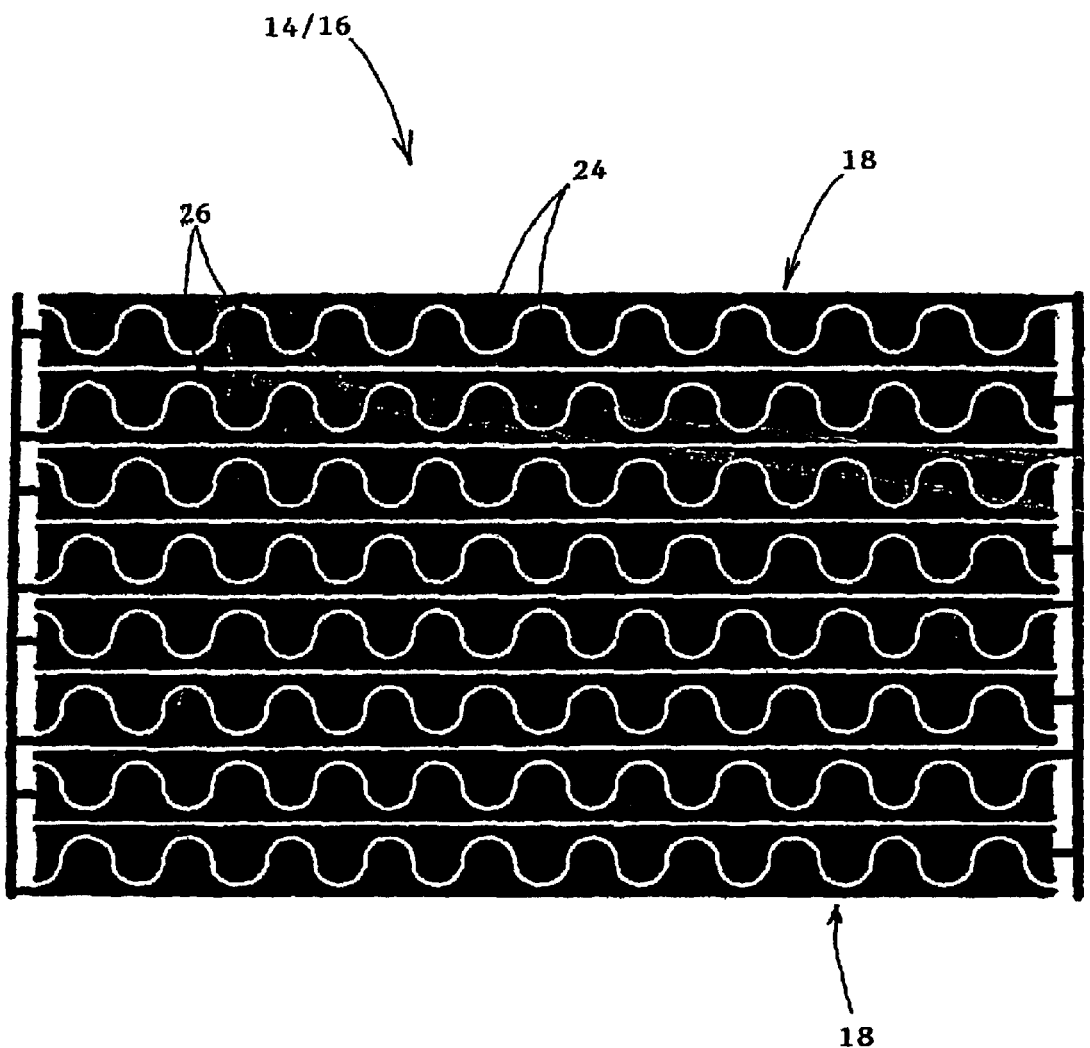
FIG. 5 shows a schematic representation of a bank of electrodes of an electro-adhesion device in one embodiment of the invention, wherein the outer surfaces of the electrodes are shaped so that they have varying surface areas so that, in use, the object to be attracted may be made from any one of a variety of materials including metals and non-metals.

Referring to the drawings and FIGS. 1 and 2 in particular, reference numeral 10 generally indicates an electro-adhesion device in accordance with the invention. The electro-adhesion device 10 includes a base 12 and first 14 and second 16 banks of thin electrically conductive electrodes 18 located apart from each other on one side of the base 12. The electro-adhesion device 10 also includes an insulating cover 20 over the first 14 and second 16 banks so that the outer side of the insulating cover 20 defines an electro-adhesion surface so that, in use, when the electrodes 18 are energised and an object to be attracted is placed adjacent the insulating cover 20, the object is attracted to the insulating cover 20 by a suitably high adhesion force.

Accordingly, the electro-adhesion device 10 comprises a layer formed by electrodes 18 and a layer formed by the base 12, wherein the base 12 is thin so as to define a layer of the electro-adhesion device 10.

The first 14 and second 16 banks are separated by a gap 22 which is as small as possible to prevent charge build-up between the banks 14, 16.

The base 12 is typically made of a substance chosen to minimise leakage from the electro-adhesion device 10 such as a substance having a high bulk resistivity of at least $10^{16}$ Ω/m.

The profile of the base 12 determines the profile of the electro-adhesion surface. Accordingly, the profile of the base 12 is shaped so as to correspond to the shape of a portion of the object to be attracted, which portion is the portion which is placed adjacent the electro-adhesion surface. This serves to minimise, in use, air gaps between the electro-adhesion surface and the object to be attracted.

In this embodiment of the invention, the profile of the base 12 is flat, but it is to be understood that in other embodiments of the invention, the profile of the base 12 may follow any profile.

The base 12 is typically smooth having a surface variation of less than 0.01 µm.

The insulating cover 20 is as thin as possible as the electro-adhesion force is, amongst other factors, inversely proportional to the distance between the electrodes 18 and the object to be attracted. The cover 20 is typically thinner than 100 µm.

The cover 20 is made from a substance having a high surface relative resistivity of typically more than $10^{16}$ Ω and having a high dielectric constant (Epsilon), typically of at least 6. The cover 20 is typically made from a polymer such as nylon 6 or PVC based substance.

In certain embodiments of the invention, the cover 20 is in the form of a thin film which is applied as a laminate. In other embodiments, the cover 20 is in the form of an enamel coating applied as a spray on, dip in, or any other suitable means of application.

The cover 20 is smooth with a surface variation of less than 0.01 µm.

With particular reference to FIGS. 3 and 4, reference numeral 10.1 generally indicates an electro-adhesion device in accordance with another embodiment of the invention. The electro-adhesion device 10.1 substantially resembles the electro-adhesion device 10 and, accordingly, like reference numerals have been used to indicate the same or similar features unless otherwise indicated. In this embodiment of the invention, the base is in the form of an insulating cover 20.1 as described above. Accordingly the banks 14, 16 are sandwiched between two covers 20, 20.1 so that the electro-adhesion device 10.1 includes two electro-adhesion surfaces.

FIG. 5 shows a bank 14/16 of elongate electrodes 18 substantially parallel to each, in accordance with a preferred embodiment of the invention. Adjacent electrodes 18 form an electrode pair, which electrode pair is energised, in use, so as to be oppositely polarised thereby causing a charge differential in a part of the object adjacent that electrode pair which in turn causes the object to be attracted to the electro-adhesion surface.

Each of the electrodes 18 has an outer surface 24 facing away from the base 12 which outer surface 24 has dimensions in any direction greater than the distance from such outer surface 24 to the base 12, which distance is the thickness of the electrode 18. Each electrode 18 is typically extremely thin so as to limit charge build-up between adjacent electrodes 18. Each electrode 18 is typically less than 5 µm thick.

The electrodes 18 are typically silkscreen electrodes or vapour deposition electrodes.

The bank 14/16 is configured so that as little air as possible is trapped between adjacent electrodes 18.

Adjacent electrodes 18 are located apart from each other by a fixed minimum distance 26 which is related to a maximum withstand voltage between the electrodes 18 before flashover occurs. As the electro-adhesion force is proportional to the voltage between adjacent electrodes, the minimum distance 26 is selected so that an appropriate voltage is accomplished between an electrode pair in order to accomplish a sufficient electro-adhesion force without flashover occurring.

The electrodes 18 are shaped to limit sharpness of corners of the electrodes 18 thereby reducing the possibility of flashover occurring.

The shapes of the outer surfaces 24 of the electrodes 18 are selected depending on the material composition of the object to be attracted.

In order to attract metals the electrodes 18 would have outer surfaces 24 having large surface areas. Typically, the electro-adhesion device 10, 10.1 for metals only includes two oppositely polarised electrodes 18 separated by a single separation gap 22 between them.

In order to attract non-metals, the electrodes 18 would have outer surfaces 24 having small surface areas.

In this embodiment of the invention, the outer surfaces 24 of the electrodes 18 are shaped so that they have varying surface areas so that, in use, the object to be attracted may be made from any one of a variety of materials including metals and non-metals, the object thereby being attracted with suitable electro-adhesion force regardless of the material. Accordingly, the outer surface 24 of each of the electrodes 18 has a linear border on one side and a sinusoidal border on an opposite side so that the width of each electrode 18 varies sinusoidally lengthwise along the electrode 18 whereby the varying surface area of each electrode 18 is repetitive lengthwise along the electrode 18. Accordingly, the electrodes 18 are configured so that the sinusoidal border of one electrode 18.1 is aligned adjacent the sinusoidal border of an adjacent electrode 18.2 and so that the linear border of one electrode 18.1 is aligned adjacent the linear border of an adjacent electrode 18.3, such that the minimum distance 26 between adjacent electrodes 18 remains fairly constant.

It is to be appreciated that the linear border of one of the end electrodes 18 of the first bank 14 is located parallel to the linear border of one of the end electrodes 18 of the second bank 14 on the base 12 so as to form the gap 22.

It is also to be appreciated that in other embodiments of the invention, the electrodes 18 may be shaped and configured so that certain portions of the electro-adhesion surface attract only metals, other portions attract only non-metals and still other portions attract both metals and non-metals or any combination of two of these portions.

Typically, the electrodes 18 of an electrode pair are oppositely polarised by a low DC current, typically less than 5 µA DC, with a relatively high DC voltage, typically more than 1500 V DC.

It is further to be appreciated that in another embodiment of the invention, the electrodes 18 may be located on opposite sides of the base 12 when the base 12 is made of a substance having a high dielectric constant (Epsilon), typically of at least 5. Electrodes 18 of an electrode pair may be located on opposite sides of the base 12, which electrode pair is energised, in use, so as to be oppositely polarised thereby causing a charge differential in a part of the object adjacent that electrode pair which in turn causes the object to be attracted to the electro-adhesion surface. Electrodes 18 on the same side of the base 12 may be oppositely polarised to electrodes 18 on the opposite side of the base 12 thereby increasing the maximum withstand voltage between electrodes 18 and reducing the effect of impurities on the electro-adhesion surface. It is to be appreciated that the electrode pair in this embodiment of the invention has all the same characteristics of an electrode pair as described with reference to the drawings except that one electrode 18 of the electrode pair is located on an opposite side of the base 12. Accordingly, the transverse relationship of the electrodes 18 of an electrode pair is altered but not the planar relationship with respect to the electro-adhesion surface.

It is believed that an advantage of the invention is that a whole range of cost effective and viable electro-adhesion devices can be designed, manufactured and sold. It is further believed to be an advantage that a wide range of objects are attracted to the electro-adhesion device with adequate force to be retained in place on an electro-adhesion surface of the device.

What is claimed is:

1. An electro-adhesion device which includes:
   a base; and
   at least two thin electrically conductive electrodes located apart from each other on the base to form at least one electrode pair defining an electro-adhesion surface, wherein outer surfaces of the electrodes of at least one of the electrode pairs are shaped to have varying surface areas so that, in use, when the electrodes are energized and an object to be attracted is placed adjacent the electro-adhesion surface, the object is attracted to the electro-adhesion surface by a suitably high adhesion force regardless of the type of material from which the object is made and, accordingly, the object to be attracted may be made from any one of a variety of materials including metals and non-metals.

2. An electro-adhesion device as claimed in claim 1 wherein the electrodes are located on one side of the base so that adjacent electrodes form an electrode pair, which electrode pair is energized, in use, so as to be oppositely polarized thereby causing a charge differential in a part of the object adjacent that electrode pair which in turn causes the object to be attracted to the electro-adhesion surface.

3. An electro-adhesion device as claimed in claim 1, wherein the electrodes are located opposite sides of the base when the base is made of a substance having a high dielectric constant (Epsilon).

4. An electro-adhesion device as claimed in claim 3, wherein electrodes on the same side of the base are oppositely polarized to electrodes on the opposite side of the base thereby increasing the maximum withstand voltage between electrodes.

5. An electro-adhesion device as claimed in claim 1, wherein the electrodes are silkscreen electrodes.

6. An electro-adhesion device as claimed in claim 1, wherein the electro-adhesion device is configured so that as little air as possible is trapped between adjacent electrodes.

7. An electro-adhesion device as claimed in the claim 1, wherein shapes of the outer surfaces of the outer surfaces of the electrodes are selected depending on the material composition of the object to be attracted.

8. An electro-adhesion device as claimed in claim 1, wherein the varying surface area of the electrodes is repetitive lengthwise along the electrodes.

9. An electro-adhesion device as claimed in claim 1, wherein the outer surfaces of the electrodes have a linear border on one side and a sinusoidal border on an opposite side so that the width of each electrode varies sinusoidally lengthwise along the electrode.

10. An electro-adhesion device as claimed in claim 9, wherein the electrodes are configured so that the sinusoidal border of one electrode is aligned adjacent the sinusoidal border of an adjacent electrode and so that the linear border of one electrode is aligned adjacent the linear border of an adjacent electrode, such that the minimum distance between adjacent electrodes remains fairly constant.

11. An electro-adhesion device as claimed in claim 1, wherein the electrodes of an electrode pair are oppositely polarized by a low current with a relative high voltage.

12. An electro-adhesion device as claimed in claim 1, which comprises at least one layer formed by electrodes and a layer formed by the base, wherein the base is thin so as to define a layer of the electro-adhesion device.

13. An electro-adhesion device as claimed in claim 1, wherein the profile of the base on which the electrodes are located is shaped so as to correspond to the shape of a portion of the object to be attracted, which portion is the portion which is placed adjacent the electro-adhesion surface.

14. An electro-adhesion device as claimed in claim 1, wherein the electro-adhesion device includes an insulating cover ova the electrodes so that an outer side of the insulating cover defines the electro-adhesion surface.

15. An electro-adhesion device as claimed in claim 14, wherein the cover is in the form of a thin film.

16. An electro-adhesion device as claimed in claim 14, wherein the cover is in the form of a coating.

17. An electro-adhesion device as claimed in claim 14, wherein the cover is made from a substance having a high surface relative resistivity.

18. An electro-adhesion device as claimed in claim 14, wherein the cover is made of a substance having a high dielectric constant (Epsilon).

19. An electro-adhesion device as claimed in claim 14, wherein the base is in the form of at least a part of the insulating cover.

20. An electro-adhesion device as claimed in claim 19, wherein at least some of the electrodes are sandwiched between the two covers so that the electro-adhesion device includes two electro-adhesion surface.

* * * * *